(12) United States Patent
Li et al.

(10) Patent No.: US 11,308,545 B2
(45) Date of Patent: Apr. 19, 2022

(54) AUTOMATED ORDER TROUBLESHOOTING

(71) Applicant: ACCENTURE GLOBAL SOLUTIONS LIMITED, Dublin (IE)

(72) Inventors: Chung-Sheng Li, San Jose, CA (US); Emmanuel Munguia Tapia, San Jose, CA (US); Jingyun Fan, Berkeley, CA (US); Danielle Moffat, Highlands Ranch, CO (US); Colin Connors, Campbell, CA (US); Kayhan Moharreri, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 249 days.

(21) Appl. No.: 16/159,428

(22) Filed: Oct. 12, 2018

(65) Prior Publication Data

US 2020/0118195 A1  Apr. 16, 2020

(51) Int. Cl.
| | |
|---|---|
| *G06Q 30/06* | (2012.01) |
| *G06Q 10/06* | (2012.01) |
| *G06Q 10/08* | (2012.01) |
| *G06N 20/00* | (2019.01) |

(52) U.S. Cl.
CPC ......... *G06Q 30/0635* (2013.01); *G06N 20/00* (2019.01); *G06Q 10/0635* (2013.01); *G06Q 10/087* (2013.01)

(58) Field of Classification Search
CPC .......... G06Q 30/0635; G06Q 10/0635; G06Q 10/087; G06N 20/00; G06N 20/10; G06N 20/20
See application file for complete search history.

(56) References Cited

U.S. PATENT DOCUMENTS

| | | | |
|---|---|---|---|
| 8,918,337 B2 * | 12/2014 | Chehade ............ | G06Q 30/0605 705/37 |
| 10,726,203 B2 * | 7/2020 | Zakharov ............... | G06Q 10/20 |
| 2008/0294996 A1 | 11/2008 | Hunt et al. | |
| 2013/0035985 A1 | 2/2013 | Gilbert | |
| 2013/0204663 A1 | 8/2013 | Kahlow | |
| 2013/0254035 A1 | 9/2013 | Ramer et al. | |
| 2016/0344118 A1 * | 11/2016 | Hsieh ................... | H01R 12/714 |
| 2019/0283333 A1 * | 9/2019 | Hwang .................... | G06N 3/08 |
| 2019/0306327 A1 * | 10/2019 | Matysiak ................ | G06F 3/121 |
| 2019/0340716 A1 * | 11/2019 | Celia .................. | G06Q 30/0273 |
| 2020/0159201 A1 * | 5/2020 | Deshpande .......... | G08B 21/187 |

FOREIGN PATENT DOCUMENTS

EP    3255837 A1 * 12/2017   ............. G06N 7/005

\* cited by examiner

*Primary Examiner* — Dylan C White

(74) *Attorney, Agent, or Firm* — Mannava & Kang, P.C.

(57) ABSTRACT

Examples of automated order troubleshooting are described. In an example embodiment, sales-specific data sources associated with at least one of a process, an organization, and an industry relevant for sales operations are monitored. From the monitored sales-specific data, an operation behavioral pattern is identified, based on predefined rules. Subsequently, a behavior model capturing the operation behavioral pattern is constructed using a pre-existing behavior model library. Using the behavior model, a potential event relating to an order received to be fulfilled using the sales operation is predicted, the potential event being indicative of an issue affecting the order. Accordingly, the issue affecting the order is proactively remediated to automatically troubleshoot the order.

17 Claims, 13 Drawing Sheets

AUTOMATED ORDER TROUBLESHOOTING

BACKGROUND

In sales operations, after an order has been received, a number of steps are executed to process the order. The last step of the process is order servicing to execute delivery of the order. Usually, for servicing an order, for example, in the finance industry or in the network services industry, a lengthy process has to be followed. For example, to service the order, the order is first validated in terms of legitimacy of the order to determine whether the order can be fulfilled in the first place. For instance, a credit validation or a payment validation of the client may be carried out to validate the order. Once validated, the order can be routed to the penultimate step of order preparation, i.e., for assembly of the ordered product or for provisioning for the ordered service, as the case may be. Subsequently, the order is delivered to a client either by shipping, in case of the order being for a product, or by activation, in case of the order being for a service.

As is evident, the sales operation process has multiple milestones and each milestone is vulnerable to an error or an issue that may affect the order. For instance, the steps in the sales operation that involve logistics and supply chain activities may be particularly prone to errors and exceptions that may affect the order delivery. These errors and exceptions may include, for example, unavailability of the product or the occurrence of an event which may cause delay or cancellation of the order. However, the exceptions are usually detectable when the process reaches the milestone, which is affected by the exception, thereby leaving little room and time for managing the exception in an effective manner. Consequently, the order is unable to be fulfilled, and such order handling and management may result in client dissatisfaction and may adversely affect business.

In addition, order management issues may also arise at the end of the client. As an example, the client may also not be have a pragmatic view while placing their order, and therefore, the client may be unable to place an order that would adequately fulfill the client's requirements. In the example, while the client may be able to understand internal workflows and technological requirements, the client may not be able to predict external factors, such as evolution in the technology employed by the client, which can potentially affect the client's order as well as the client's requirements.

For instance, a company may order a certain kind of hardware and infrastructure keeping in mind a present technological and economic scenario, but does not anticipate or predict an economic decline. Accordingly, the company may place an order which might fulfill an immediate requirement, but eventually is not in the interest of the company. In case the company has a substantially large market share, such an ill-conceived order planning can have an industry-wide ripple effect. Accordingly, such external factors can affect the ordering decisions of the client. However, in the absence of the knowledge of such external factors, the client may not be in a position to make such an informed decision regarding the order. The same scenario is equally relevant from the service provider or the seller point of view. In the absence of pragmatic knowledge, the order from a downstream client can have a considerable effect on the seller or the service provider, as the case may be. This presents a technical problem wherein the existing infrastructure used for managing the last leg of the order may be unable to do so in an effective or an efficient manner.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
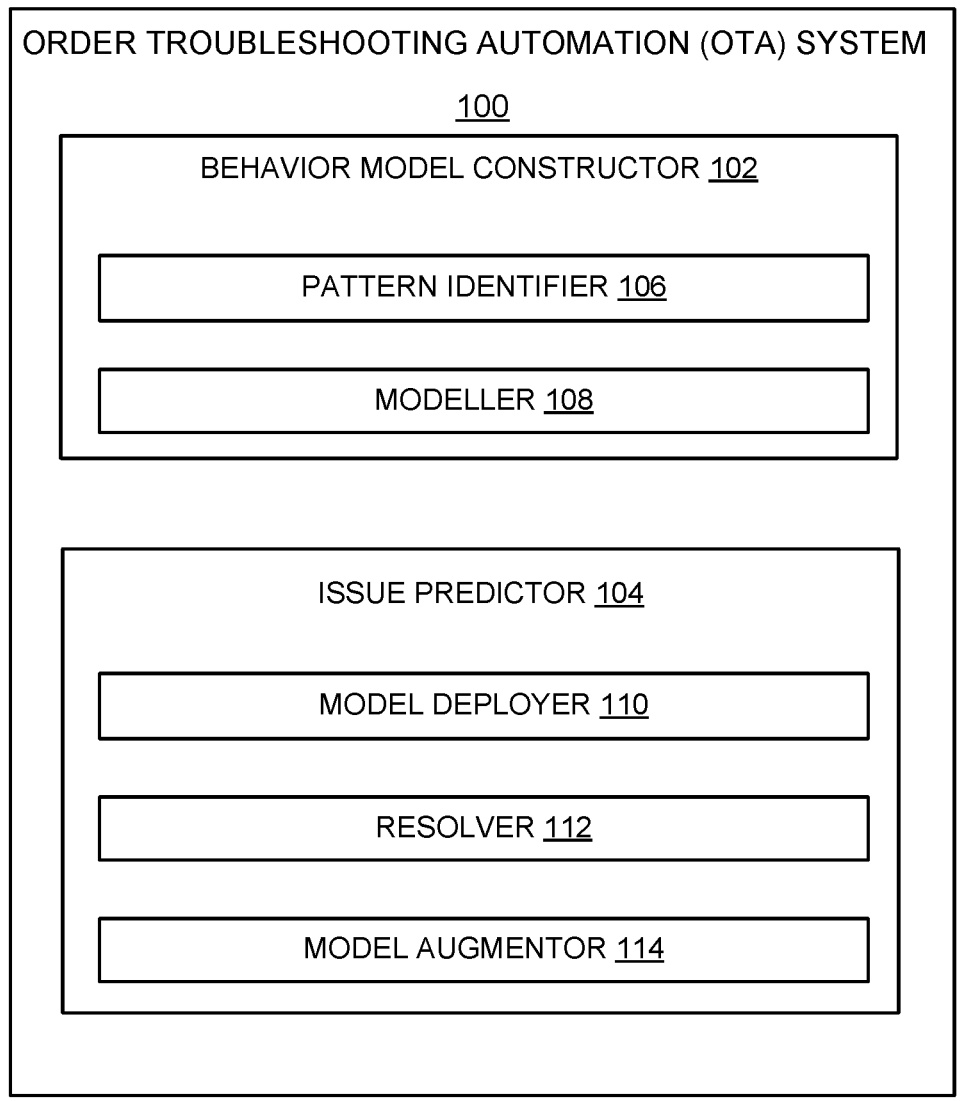
FIG. 1 illustrates a block diagram schematic of an Order Trouble-shooting Automation (OTA) system for providing automated order troubleshooting, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes aspects relating to automated order troubleshooting. In one example, the aspects described in the present disclosure facilitate in either handling the order after the order has been placed by a client and received at the service provider, or in placing the order in the first place, in a manner that addresses the latent requirements and factors that are not evidently perceivable. For purposes of this disclosure, the term client is used to indicate any party that is placing orders, whereas the term service providers has been used to indicate any party that sells, manufactures, or otherwise provides goods, products, and services to clients.

From the client's point of view, the techniques of the present disclosure provide a customized order, which adequately meets their requirements, while taking into account industry trends and practices. At the same time, for instance, any social, economic, or political situation that can affect the business, the industry trends, and therefore, the order, are considered while placing the order. In addition, the present disclosure provisions the same from the service provider's point of view. For instance, given the industry norms, the service provider may be able to effectively cater to the client requirements, keeping in mind the various factors, past, present, and future, that can affect the fulfillment of the order or affect the demand which gave rise to the order.

To begin with, as an example, the techniques for automated order troubleshooting are manifested in two stages, from an implementation perspective. First, a behavior model which captures operation behavioral pattern indicative of sales-specific behavior associated with a process, and organization and industry, or a combination thereof. In other words, the behavior model captures operation behavioral pattern that is followed by clients in relation to a specific process, or by the client organization, or by the industry that the client belongs to. In the second stage then, the behavioral model is deployed when an order is placed or received, as the case may be. The behavior model is deployed to gauge the past, present, and the future scenarios, for determining whether the order can be affected or not, and if it can be affected, automatic troubleshooting for the order is triggered in order to mitigate or completely prevent the order from being affected.

In operation, as part of the model construction, sales-specific data sources associated with a process, an organization, an industry, or a combination thereof relevant for sales operations can be monitored. In an example, the process, the organization, and the industry that is relevant to the sales operation can be selected based on the operation of the party implementing the techniques of the present disclosure. For the purposes of this disclosure, the term "sales operation" intends to cover the sales operations conducted by a service provider in a manner of selling the product and the services as well as the operation by a client in a manner of placing orders for the products and services offered by various service providers, sellers, and manufacturers.

For instance, in case the party implementing the automated order troubleshooting technique of the present disclosure is the service provider, then the process or the organization or the industry can be related to either the client that the service provider caters to or the industry or field that the service provider operates in. On the other hand, for instance, if the party implementing the automated order troubleshooting is a client, then the monitoring of the process, the organization, and the industry can be related to the industry or field that the client operates in or the standard industry-specific processes that the client would implement. The monitoring of the sales operations can be achieved, in real-time, by querying various data bases and repositories of information, online as well as offline, from which the relevant data can be retrieved. For example, social media, online web portals, and other websites that carry information regarding the process, the organization, the industry, or a combination thereof can be crawled for retrieving and monitoring the above mentioned information.

Once the sales-specific data has been retrieved and stored, an operation behavioral pattern can be identified based on the sales-specific data. In an example, the behavioral pattern so identified can indicate, based on the sales-specific data, the current and future trends that can affect, for instance, demand and supply in the industry, and difference in the current trends from previous trends. The operation behavioral pattern can be identified using the sales-specific data based on predefined rules, the predefined rules mirroring the process, the organization, and the industry relevant for the party conducting the automated order troubleshooting. In an example, the predefined rules can be based on historically recorded cases for that ordering process in that industry, process, organization, and the like.

With the operation behavioral pattern ascertained, the behavior model is then constructed to emulate the monitored sales-specific data as well as the operation behavior pattern as mentioned above. In an example, a pre-existing behavior model library can be the basis for constructing the behavior model. For instance, the pre-existing behavior model library can serve as a template for generating the behavior model which attempts to mimic the operation behavioral pattern. According to an aspect, the behavior model attempts to capture various steps of the sales operation, in which each step has been identified as an issue-causing juncture in the sales operation. In other words, the behavior model attempts to capture as many as possible points of failure in the sales-to-delivery process in order management. At the same time, the behavior model traces the sales operation from order placement to final delivery for achieving the capability of predicting the potential event. This concludes first phase of automated order troubleshooting in with the construction of the behavior model.

As mentioned previously, in the second phase, the behavior model is implemented for order management, and for automatically troubleshooting orders, where necessary. The automation of troubleshooting implies that there is no human intervention at any stage, and the process of order handling, management, and troubleshooting is machine-executed. In the second phase, the behavior model and the associated processes are triggered as soon as an order is placed.

As part of deployment of the behavior model, any potential event relating to the order received to be fulfilled using the sales operation is predicted based on the behavior model. The potential event is indicative of an issue that can affect the order directly or indirectly. For example, a direct influence can be in the form of a real and present event, such as a natural calamity, that can affect the order fulfilment. An indirect influence can be in the form of an economic, political, or social situation brewing in a region which may affect demand or supply, in turn, potentially affecting the order. In addition, as mentioned previously, the prediction of the order being affected can be from the point of view of the service provider or of the consumer. In either case, the factors may be same or similar. As mentioned previously, the behavior model is built to trace the sales operation from order placement to final delivery to predict the potential event.

In an example, as part of the prediction of the potential event, an investigation of previously encountered exceptions during sales process and previously raised issues during sales process may also be done to identify the potential event or issue affecting the order. Further, the present disclosure provides aggregation of newfound influencers in the behavioral model. Accordingly, in one example, the order is investigated to determine whether the order conforms to the behavioral model or not, which, as mentioned above, is done on the basis of the operation behavioral pattern associated with that order. In the eventuality that the order does not conform to the behavioral model, a hypothesis is generated for that order and the hypothesis incorporated in the behavioral model, so as to enable prediction of the potential event even in such an eventuality. In other words, in case the order does not conform to the behavior model, which means that the behavior model is unable to accurately mirror the operation pattern, then this new behavioral pattern is incorporated into the behavior model.

In case an event that can potentially affect the order is predicted, automatic troubleshooting of the order is initiated and proactive remediation of the issue affecting the order is achieved. For example, in one case, a hypothesis is generated based on historical data and a recommendation for resolving the issue is provided based on the hypothesis. In addition, as part of automation of order troubleshooting, an alert can be generated for all stakeholders, such as sales team, operations team, delivery teams, and validation teams, in the sales operation, in response to the prediction of the potential event, which in turn indicates the issue affecting the order. This may allow the stakeholders to pre-emptively provide a resolution to the identified issue.

FIG. 1 illustrates an order troubleshooting automation (OTA) system 100 for providing automated order troubleshooting, according to an example embodiment of the present disclosure. In an example embodiment, the OTA system 100 facilitates in either handling the order after the order has been placed by a client and received at the service provider, or in placing the order in the first place, in a manner that it addresses the latent requirements and factors that are not evidently perceivable. Accordingly the OTA system 100 may be deployed at either the client end or at the service provider end. As mentioned previously also, though the term sales operation has been used previously as well as henceforth, it will be understood that the term means to cover the sales operations conducted by a service provider in a manner of selling the product and the services as well as the operation by a client in a manner of placing orders for the products and services offered by various service providers, sellers, and manufacturers.

At the client end, in an example, the OTA system 100 may provide a tailor-fitted order, which adequately meets their requirements, while taking into account industry trends and practices. At the same time, the OTA system 100 may also consider external, possibly hidden factors, for instance, any social, economic, or political situation, that can affect the business, the industry trends, the market demand, and therefore, the order, while placing the order. In addition, the OTA system 100 may provide a similar facility when implemented at the service provider's end. For instance, the OTA system 100 may be able to take into account the industry norms and various other factors that can affect the fulfilment of the order or affect the demand, which gave, rise to the order in the first place, to allow the service provider to effectively cater to the client requirements.

As part of achieving the above function, the OTA system 100 can include a behavior model constructor 102 and an issue predictor 104. The behavior model 102 constructs a behavior model that can mirror the various factors that may influence an order, whereas the issue predictor 104 can use the behavior model and provide automated order troubleshooting. In addition, the issue predictor 104 may also include provisions for improving the behavior model in cases where the behavior model is unable to cater to a situation. The behavior model constructor 102 can include a pattern identifier 106 and a modellor 108 to accomplish the above mentioned function of the behavior model constructor 102. Further, the issue predictor 104 includes a model deployer 110, a resolver 112, and a model augmentor 114 to facilitate the issue predictor 104 in predicting an issue for automatically troubleshooting an order.

Therefore, the behavior model constructor 102 and the issue predictor 104 can operate in two phases, from an operation perspective. In the first phase, the behavior model constructor 102 builds a behavior model which captures operation behavioral pattern indicative of sales-specific behavior associated with a process, and organization and industry, or a combination thereof, associated with the party implementing the OTA system 100. In other words, the behavior model constructor 102 creates the behavior model to capture operation behavioral pattern that is followed by clients in relation to a specific process of the service provider or vice versa, or by the implementer's organization, or by the industry that the implementer belongs to. In the second phase then, the issue predictor 104 deploys the behavioral model when an order is placed or received, as the case may be. In an example, the issue predictor 104 deploys the behavior model to gauge the past, present, and the future scenarios, for determining whether the order can be affected or not, and if it can be affected. Accordingly the issue predictor 104 carries out automatic troubleshooting for the order to mitigate or completely prevent the order from being affected.

In operation, as part of the model construction, the pattern identifier 102 can monitor, in real time, various sources of information that can be relevant for maintaining a watch over the factors that could possibly influence the completion or non-completion of an order whether for a service provider or for a client. Accordingly, the pattern identifier 106 monitors sales-specific data sources associated with a process, an organization, an industry, or a combination thereof relevant for sales operations can be monitored. In an example, the process, the organization, and the industry that relevant to the sales operation can be selected based on the operation of the party implementing the techniques of the present disclosure.

For instance, in case the implementer of the OTA system 100 is the service provider, then the process or the organization or the industry can be related to either the client that the service provider caters to or the industry or field that the service provider operates in. On the other hand, for instance, if the implementer of the OTA system 100 is a client, then the monitoring of the process, the organization, and the industry can be related to the industry or field that the client operates in or the standard industry-specific processes that the client would implement. The pattern identifier 106 can, in real-time, query various data bases and repositories of information, online as well as offline, from which the relevant data can be retrieved. For example, the pattern identifier 106 may query social media, online web portals, and other websites that carry information regarding the process, the organization, the industry, or a combination thereof, which can be crawled by the pattern identifier 106 for retrieving and monitoring the above mentioned information.

Once the sales-specific data has been retrieved and stored, the pattern identifier 106 may identify an operation behavioral pattern based on the sales-specific data. In an example, the behavioral pattern so identified by the pattern identifier 106 can indicate the current and future trends that can affect, for instance, demand and supply in the market for goods and services relevant for an industry, and difference in the current trends from previous trends. The pattern identifier 106 may identify the operation behavioral pattern using the sales-specific data based on predefined rules which may attempt to emulate the process, the organization, and the industry relevant for the implementer conducting the automated order troubleshooting. In an example, the predefined rules can be based on historically recorded cases for that ordering process in that industry, process, organization, and for that implementer.

With the operation behavioral pattern ascertained, the modellor 108 can then construct the behavior model to emulate the monitored sales-specific data as well as the operation behavior pattern as mentioned above. In an example, the modellor 108 can take into account a pre-existing behavior model library as the basis for constructing the behavior model. For instance, the modellor 108 can use the pre-existing behavior model library as a template for generating the behavior model which attempts to mimic the operation behavioral pattern.

According to an aspect, the behavior model so constructed by the modellor 108 traces the sales operation from order placement to final delivery for achieving the capability of predicting the potential event. At the same time, the modellor 108, through the behavior model, can attempt to capture various steps of the sales operation, in which each step has been identified as an issue-causing juncture in the sales operation. In other words, the behavior model can attempt to capture as many as possible points of failure in the sales-to-delivery process in order management.

Further, as mentioned previously, subsequent to creation of the behavior model, the issue predictor 104 implements the behavior model created by the behavior model constructor 102 for order management, and for automatically troubleshooting orders, where necessary. In an example, the issue predictor 104 is triggered for deploying the behavior model as soon as an order is placed by the client or received by the service provider, as the case may be.

As part of deployment of the behavior model, the model deployer 110 uses the behavior model to predict any potential event relating to the order that will be fulfilled using the sales operation. The model deployer 110 can predict the potential event to indicate an issue that can affect the order directly or indirectly. For example, a direct influence can be in the form of a real and present event, such as a natural calamity, that can affect the order fulfilment. An indirect influence can be in the form of an economic, political, or social situation brewing in a region which may affect a demand or supply which, in turn, affects the order.

In addition, as mentioned previously, the model deployer 110 can predict the order being affected from the point of view of the party implementing the OTA system 102, i.e., the service provider or the consumer. In either case, the model deployer 110, in an example, may identify that the potential event can be the same, and may equally affect the clients as well as service providers. As mentioned previously, the model deployer 110 uses the behavior model to trace the sales operation from order placement to final delivery to assess each point of failure along the way so as to accurately predict the potential event, subsequently, its effect on the order, and may recommend a possible resolution.

In an example, as part of the prediction of the potential event, the model deployer 110 can conduct an investigation of previously encountered exceptions during sales process and previously raised issues during sales process to identify the potential event or issue affecting the order. In addition, in the example, as part of the investigation, the model deployer 110 may further collect evidence in the form of historical cases. In case an event that can potentially affect the order is predicted, the resolver 112 initiates automatic troubleshooting of the order and performs a proactive remediation of the issue affecting the order. For example, in one case, as part of the automated troubleshooting, the resolver 112 may generate a hypothesis based on the historical case data and then build a recommendation based on the hypothesis for remediating the issue. In an example, the recommendation can be in the form of an action item that can be performed by the implementer of the OTA system 100 to mitigate the effects of the issue on the order or to altogether avoid the effects.

In addition, as part of automation of order troubleshooting, the resolver 112 can generate an alert or all stakeholders, such as sales team, operations team, delivery teams, and validation teams, in the sales operation, in response to the prediction of the potential event, which may allow the stakeholders to preemptively provide a resolution to the issue associated with the predicted event.

Further, the OTA system 100 may also provide aggregation of newfound influencers which were earlier either not known or not considered, in the behavioral model. Accordingly, in one example, the model augmentor 114 investigates the order and its conformance to the behavioral model on the basis of the operation behavioral pattern associated with that order. For instance, the model augmentor 114 can determine whether the current order falls within the category of known operation behavior patterns or is it an outlier. In case the order does not conform to the behavior model, it may indicate that the behavior model is unable to accurately mirror the operation pattern, then this new behavioral pattern is incorporated into the behavior model. In the eventuality that the model augmentor 112 determines that the order does not conform to the behavioral model, the model augmentor 114 further generates a hypothesis for that order and incorporates the hypothesis in the behavioral model, so as to enable prediction of the potential event even in such an eventuality. In an example, the model augmentor 114 can, based on the hypothesis, generate a recommendation as to the changes in the behavioral model which would accommodate the impact due to the new order.

Figure 2A:
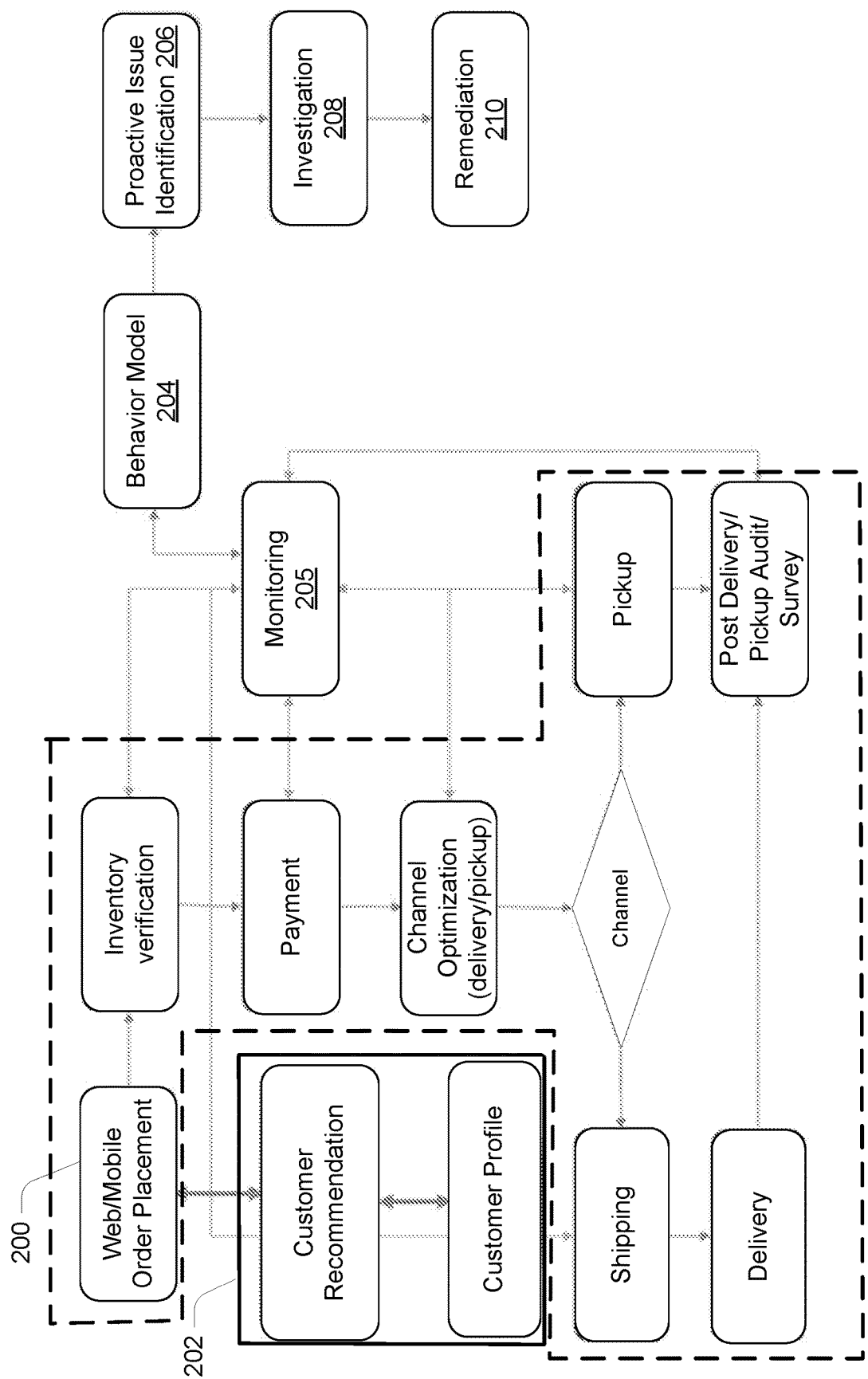
FIG. 2A, FIG. 2B, and FIG. 2C illustrate examples of use of the OTA system for the purposes of providing automated order troubleshooting, according to an example embodiment of the present disclosure.
Figure 2B:
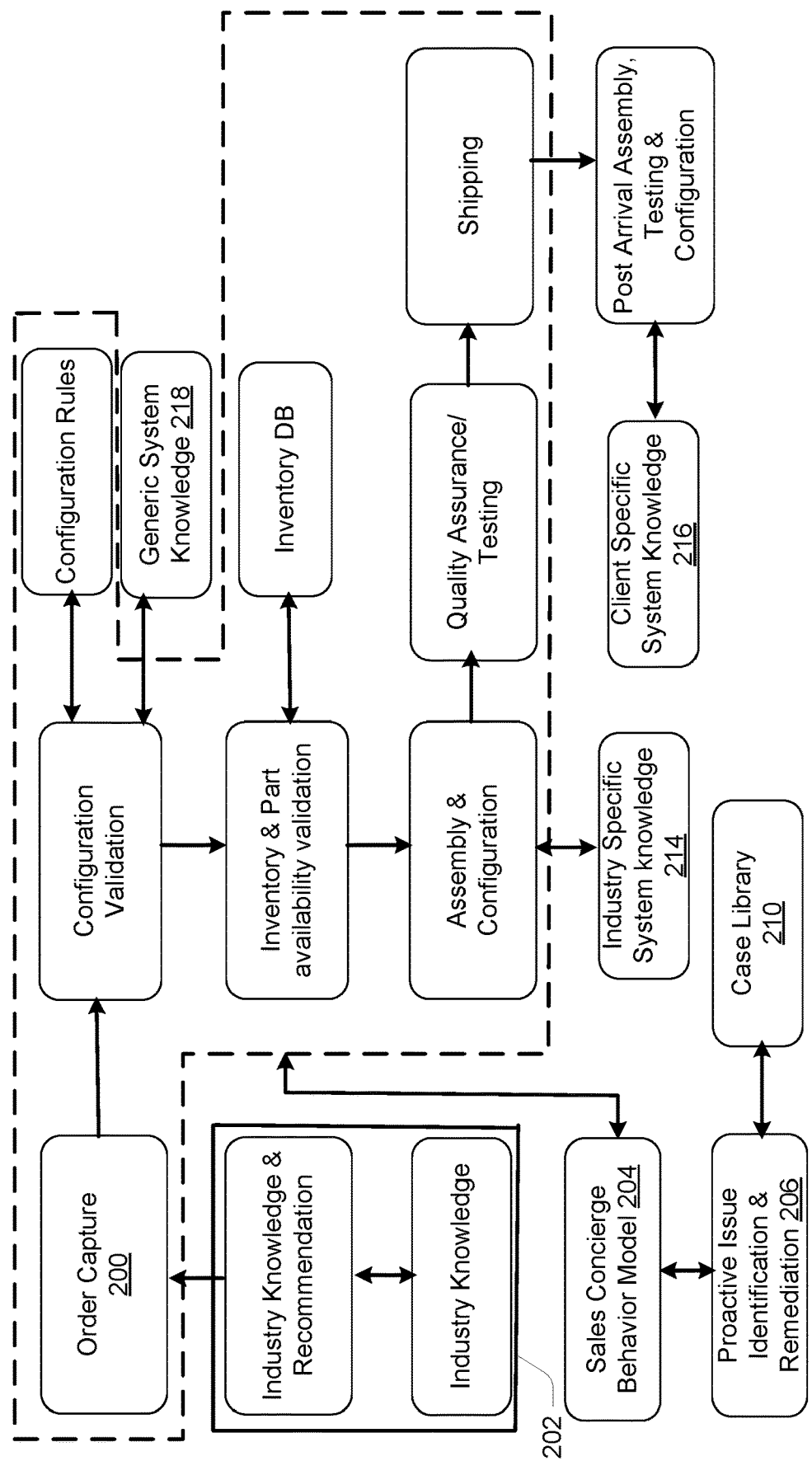
Figure 2C:
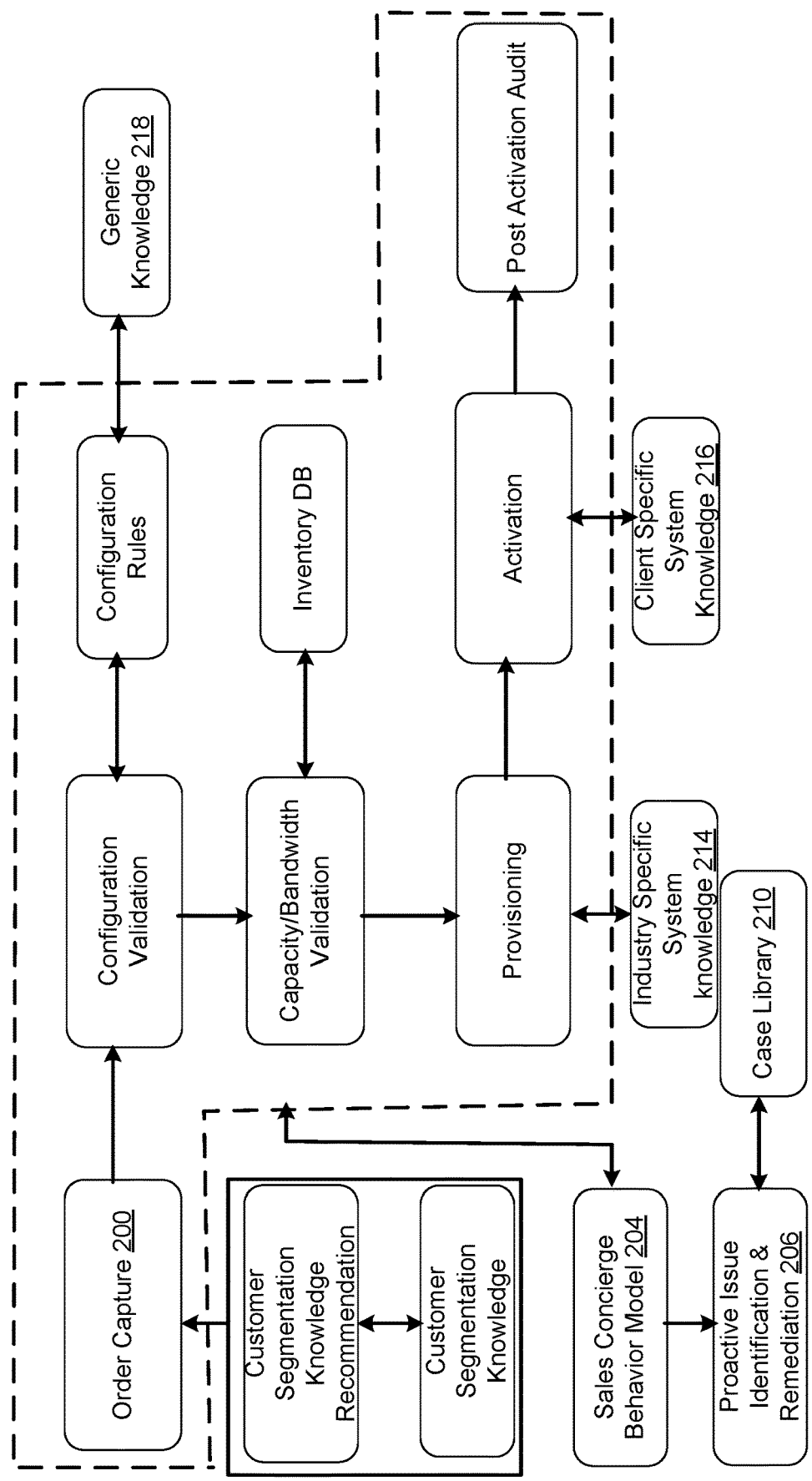

FIG. 2A, FIG. 2B, and FIG. 2C illustrate examples of the implementation of the OTA system 100 for the purposes of providing automated order troubleshooting, according to an example embodiment of the present disclosure. While FIG. 2A illustrates the implementational example of the OTA system 100 when used in the field of products, in general, FIG. 2B illustrates the implementational example of the OTA system 100 in the field of electronics and high-technology products and services for use in financial services, and FIG. 2C illustrates the implementation example of the OTA system 100 when used in the network services industry. For the sake of brevity and ease of understanding, FIG. 2A, FIG. 2B, as well as FIG. 2C are described in conjunction to the extent that they have common components. As mentioned previously, the OTA system 100 can be implemented by the clients and service providers alike. Further, in all the figures, FIG. 2A, FIG. 2B, and FIG. 2C, the parts of the implementational example within the dotted box indicates the steps implemented conventionally as part of the general order management and processing procedures, whereas the portions of the example which fall outside the dotted lines indicate the contribution of the OTA system 100 to the procedures of order handling and processing, as an example. Again, for the sake of brevity, the description below focusses on the OTA system 100 and not on the conventionally known part of the procedure.

As shown in FIGS. 2A, 2B, and 2C, the first block 200 is where the implementer's systems capture an order or a request for a service, or as shown in FIG. 2A, a request for replacement of a product. As mention above, as soon as the order is captured, the issue predictor 104 is triggered into action. Accordingly, at block 202 in FIG. 2A, 2B, and 2C, recommendations are received from the stakeholders relevant to the implementer. For example, when the implementer of the OTA system 100 is the client, then the recommendation can be received as part of the industry knowledge. On the other hand, if the implementer is the service provider, then the recommendation is received from the client or as part of the client segmentation knowledge.

Further, after the implementer' system has received recommendations and validation of the orders has to be performed, for example, in terms of the validation of inventory, or validation of bandwidth, or validation of configuration in cases of electronic equipment, or payment validation, the OTA system 100 kicks in at block 204 and constructs and deploys the behavior model. FIG. 2A also shows the monitoring performed by the pattern identifier 106 by operating block 205. The functional and operational details with respect to the operation in reference to blocks 204 and 205 have been explained in detail with respect to FIG. 1.

The issue predictor 104 operates block 206 uses the model deployer 110 and the resolver 112 in order to, first, identify potential threats to the order, and, secondly, proactively remediate the threats to provide automated order troubleshooting in order to ensure that the order remains unaffected or is the effects are at least mitigated. This is performed in the manner explained previously with respect to FIG. 1.

Further, as shown in FIG. 2A and also as explained above, the model deployer 110 can operate block 208 conduct an investigation of previously encountered exceptions during sales process and previously raised issues during sales process to identify the potential event or issue affecting the order. In addition, in the example, as part of the investigation, the model deployer 110 may further collect evidence in the form of historical cases 210. Block 212 is triggered in case an event that can potentially affect the order is predicted, where the resolver 112 initiates automatic troubleshooting of the order and performs a proactive remediation of the issue affecting the order.

As shown at least in FIG. 2B and 2C, in addition to operation of block 202 where industry or client recommendations are taken into consideration, in operation of block 214, block 216, and block 218, the OTA system 100 takes into account the industry specific knowledge, the client specific knowledge, as well as generic knowledge. As a result, the OTA system 100 is well-equipped to be able to predict with considerable accuracy any factors or events that can potentially affect the order, in terms of the industry or client standards and requirements, as well as in terms of latent events that the industry or the client alone are unable to capture, foresee, or take into consideration.

For instance, even for the client requirements and standards, few of the client standards and practices may be disclosed by the client for the service provider to effectively service the requests. However, there may be other specific client-end policies, practices, and norms, such as internal workflows, environments, and existing system configurations, that the client may not disclose but the OTA system 100 is able to capture to provide high quality service in terms of order fulfilment and reduction of risk for the service provider as well as for the client. For example, the pattern identifier 106 may determine from the monitoring that the client is in the growth stage and, therefore, might require an aggressive order. However, if the order that is actually received is not aggressive enough and does not align with the requirements of the client, therefore, the resolver 112 may recommend an aggressive order for the client. The model deployer 110 may, in this example, ascertain that in the absence of an aggressive order, the client would be unable to meet the market demand and, which in turn, would affect the paying ability of the client. Accordingly, the resolver 112 may recommend an aggressive order keeping in mind the interest of the client as well as of the service provider itself.

Figure 3:
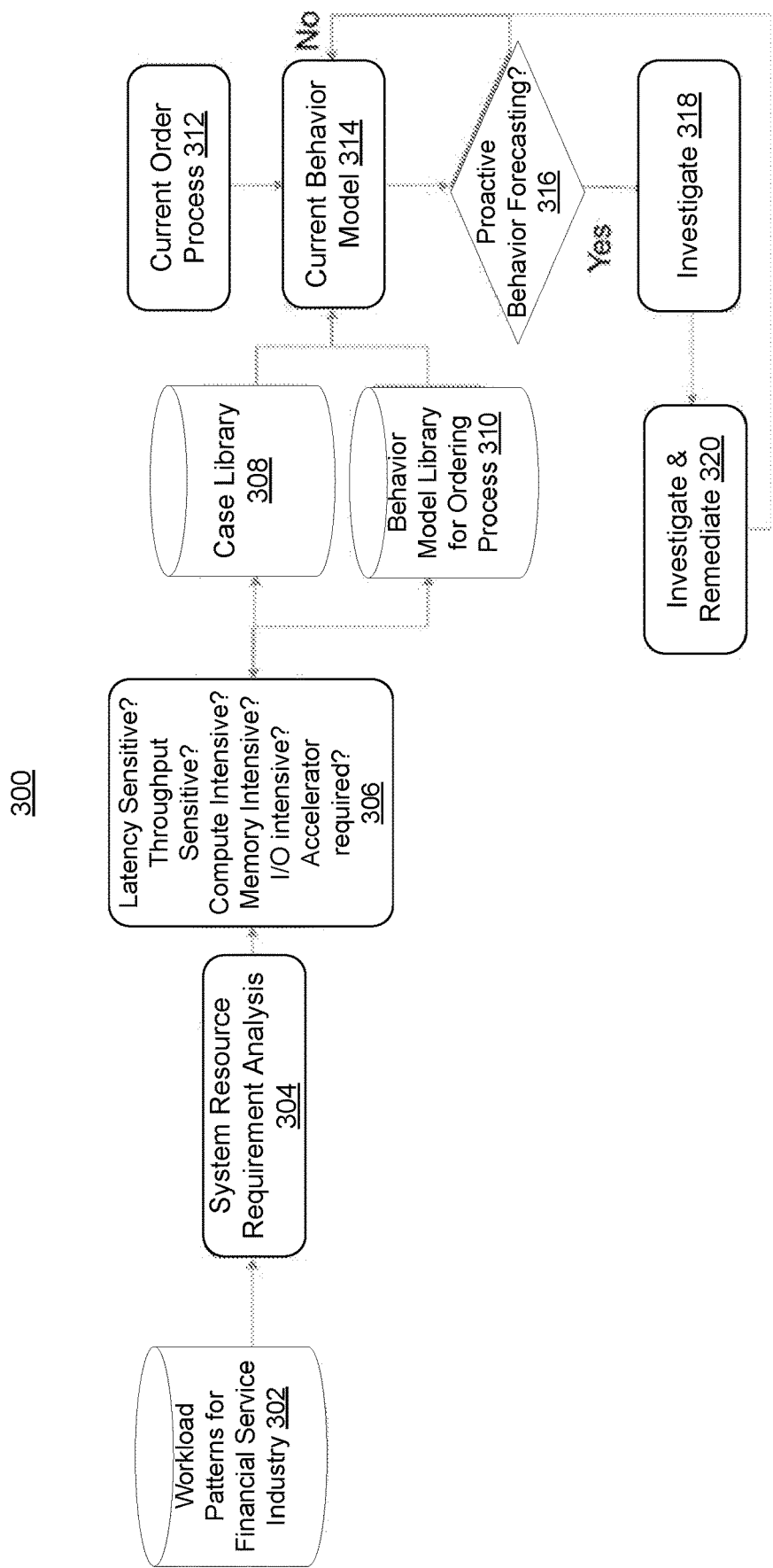
FIG. 3 illustrates behavior model creation and deployment by the OTA system, according to an example embodiment of the present disclosure.

FIG. 3 illustrates the behavior model creation and deployment 300 by the OTA system 100, according to an example embodiment of the present disclosure. For instance, in the above example, FIG. 3 illustrates the behavior model for electronics and high-technology for the financial service industry in continuation to the example shown in FIG. 2B.

As shown in FIG. 3, pattern identifier 106 operates block 302 to obtain operation behavior pattern in the form of workload behavior patterns for the relevant industry, such as the financial services industry, on the implementer's systems. For example, the pattern identifier 106 can determine workload patterns on the various system components and the variation in the workloads during day and during night, types of workloads at different times of the day, and expected deviation from the determined workloads. Further, the pattern identifier 106 operates blocks 304 and 306 to perform an analysis of the system's resource requirement which involves determining whether the system is sensitive to latency, throughput, computational power, memory, input-output operations, and whether the system requires any upgrade or supplemental components to meet the needs.

Once the pattern identifier 106 has performed the identification of the operation behavioral pattern in the above mentioned manner, the modellor 108 operates block 308 and 310, for instance, simultaneously, to use a library of previously handled cases by the OTA system 100 and a library of behavior models previously constructed by the OTA system 100 for the ordering process for the implementer. In addition, the modellor 108 may also take into account the current ordering process followed by the implementer to construct the behavior model by operating block 312.

Subsequently, the model deployer 110 operates block 314 to deploy the constructed behavior model for the current operation behavior pattern, after an order is placed. The resolver 112 can operate block 316 to proactively forecast the behavior and to predict the point of failure of the order management process. In the manner explained above, the resolver 112 can operate blocks 318 and 320 to generate a hypothesis based on historical data using the behavior model, and then provide a recommendation based on the hypothesis for remediating the issue.

In addition, the model augmentor 114 can operate the path 322 from block 316 if the current behavior model is unable to cater to the present order and is unable to effectively predict the issue that can affect the order. Accordingly, in the manner explained previously, the model augmentor 114 can investigate the non-conformance of the order and the behavioral, generate a new hypothesis for the order, and incorporating the hypothesis in the behavioral model to predict the potential event. The model augmentor 114 may then operate at blocks 308 and 310 and save the modified behavioral model in the model library and the current case in the case library for later use.

Figure 4:
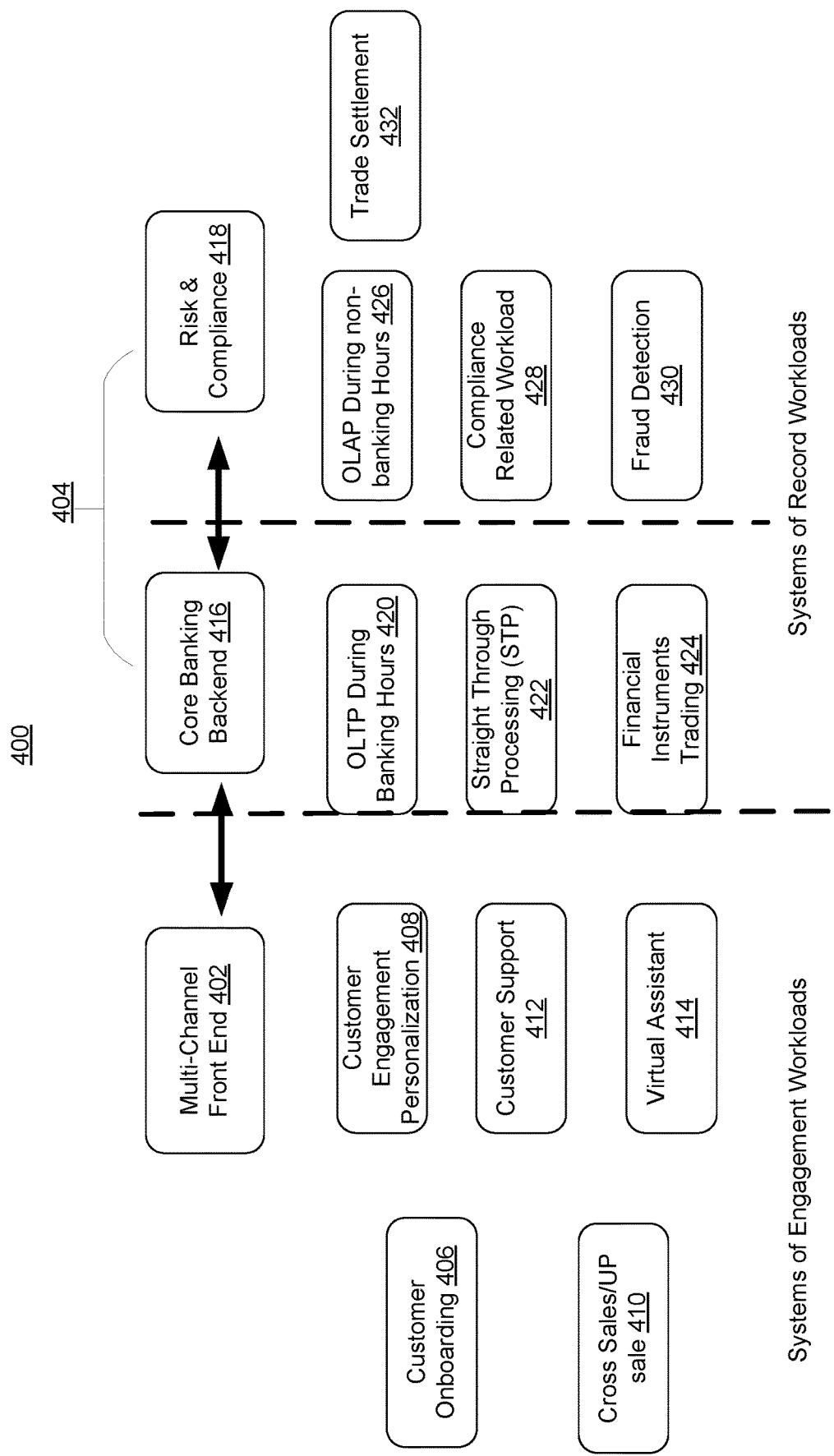
FIG. 4 illustrates workload behavior patterns of FIG. 3, according to an example embodiment of the present disclosure.

FIG. 4 illustrates the workload behavior patterns discussed in block 302 in FIG. 3 for the implementer systems in the electronics and high-technology for the financial service industry, in accordance with an example embodiment of the present disclosure.

In the example shown in FIG. 4, the workload behavior patterns may include workloads 400 that are shown as divided into front-end workloads 402 and record or backend workloads 404. For instance, the front-end workloads 402 may include client onboarding workloads 406, client engagement personalization workloads 408, cross-selling or up-selling workloads 410, client support workloads 412, and virtual assistance workloads 414—all of them built into the implementer system for catering to service providing in the financial services industry.

Further, the backend workloads 404 may further be divided into core-banking workloads 416 and risk, compliance, and settlement (RCS) workloads 418. For instance, the core-banking workloads 416 may be characterized by TPC-C benchmark used for benchmarking online transaction processing whereas the RCS workloads 418 can be characterized by TPC-H benchmark used for benchmarking decision support in the financial services industry.

In an example, the core-banking workloads 416 can involve transactional processes handled by the implementer system during the day where large number of transactions are handled by the implementer system. Accordingly, the implementer system may require resources which are capable of handling a large number of light transactions and ones that are capable of quickly storing the transaction data. Accordingly, the core-banking workloads 416 can include online transaction processing (OLTP) workloads 420, straight-through processing (STP) workloads 422, and financial instruments trading workloads 424.

On the other hand, in one example, the RCS workloads 418 may involve transactional processes that are handled by the implementer system during the night when the settlement of the transactions has to be completed by the implementer system. Accordingly, in the present example, the implementer system may have to handle batch transactions that may be fewer in number but are resource-heavy as they may perform analytics, compliance and risk checks, verifications, and validations of the few selected transactions performed during the day. The implementer system, therefore, may require computing resources in terms of processing and storage capability. Accordingly, the RCS workloads 418 can include online analytical processing (OLAP) workloads 426, compliance related workloads 428, fraud detection workloads 430, and trade settlement workloads 432.

Figure 5:
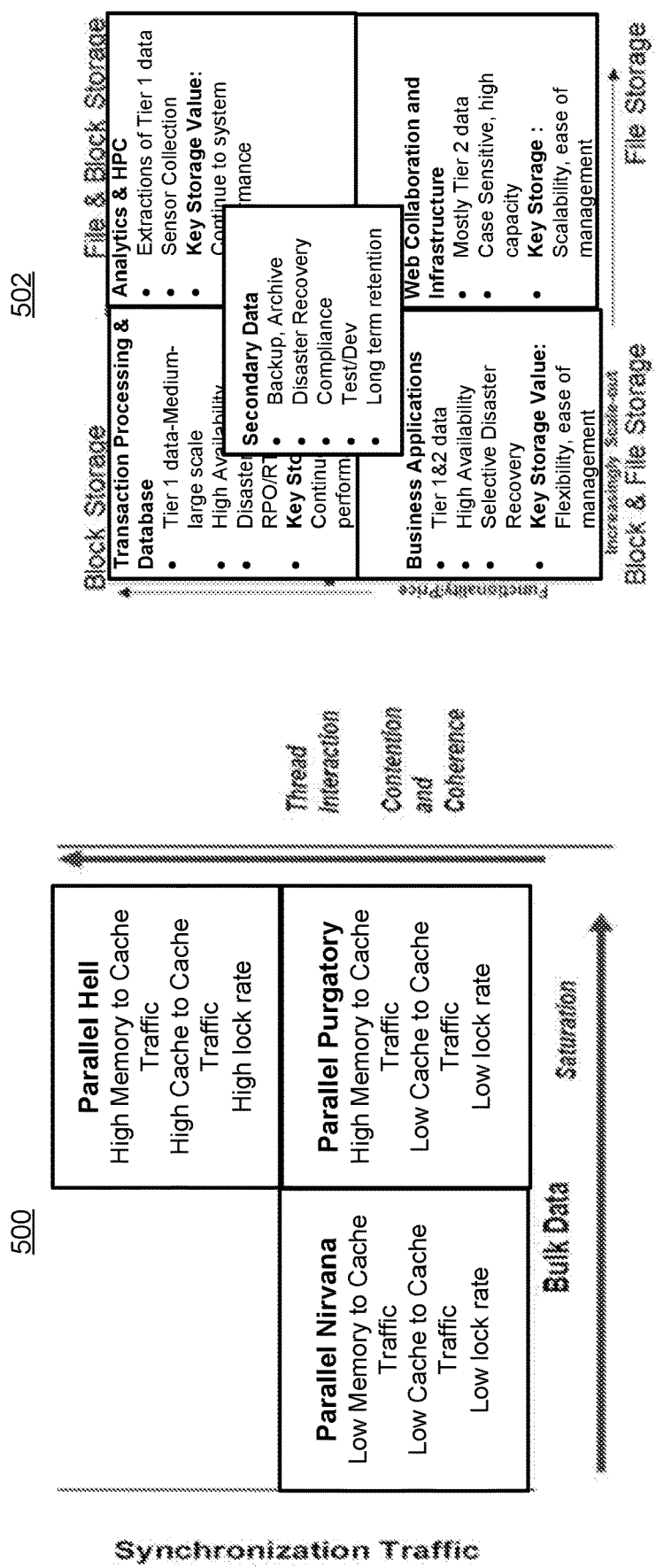
FIG. 5 illustrates characterization of workloads of FIG. 4, according to an example embodiment of the present disclosure.

As an example, FIG. 5 illustrates the characterization of the various workloads 400 discussed with reference to FIG. 4 above on the basis of various system requirements. For example, the workloads 400 can be characterized based on synchronization traffic, bulk data, and thread contention as shown in chart 500. In another example, the workloads 400 may be characterized based on data and the storage required for that data as shown in chart 502. In the present example, the data and the storage may be based on transaction processing and the database used, the analytics and high-performance computing (HPC) performed, the web collaboration and infrastructure used by the implementer system, and the business applications that are run by the implementer system.

Figure 6:
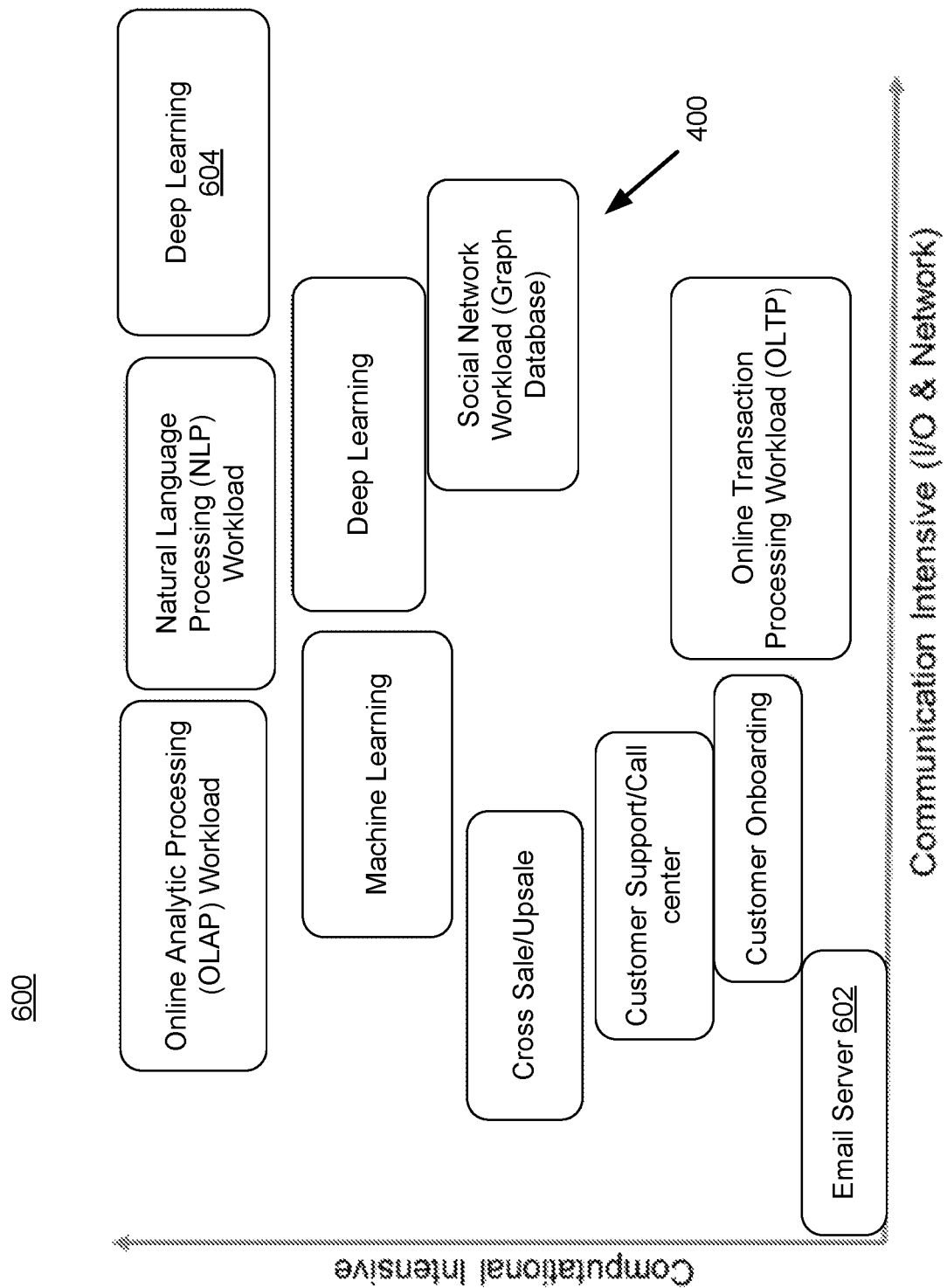
FIG. 6 illustrates characterization of workloads of FIG. 4, according to an other example embodiment of the present disclosure.

As another example of characterization of workloads 400, FIG. 6 illustrates a chart 600 which shows system resource usage as a basis of workload characterization. In the present example, the workloads 400 can be characterized based on computational intensiveness of the workloads 400, i.e., if the workloads 400 use high processing capability as well as high storage capacity resources, and on the basis of the communication intensiveness, i.e., whether the workloads 400 use high capacity input-output and network resources. Accordingly, the workloads 400 in the implementer system may range from email server workloads 602 which are low on computational as well as communication intensiveness to deep learning workloads 604 which are high on both computational and communication intensiveness, with various other kinds of workloads 400 in between the two, as shown in FIG. 6.

Figure 7:
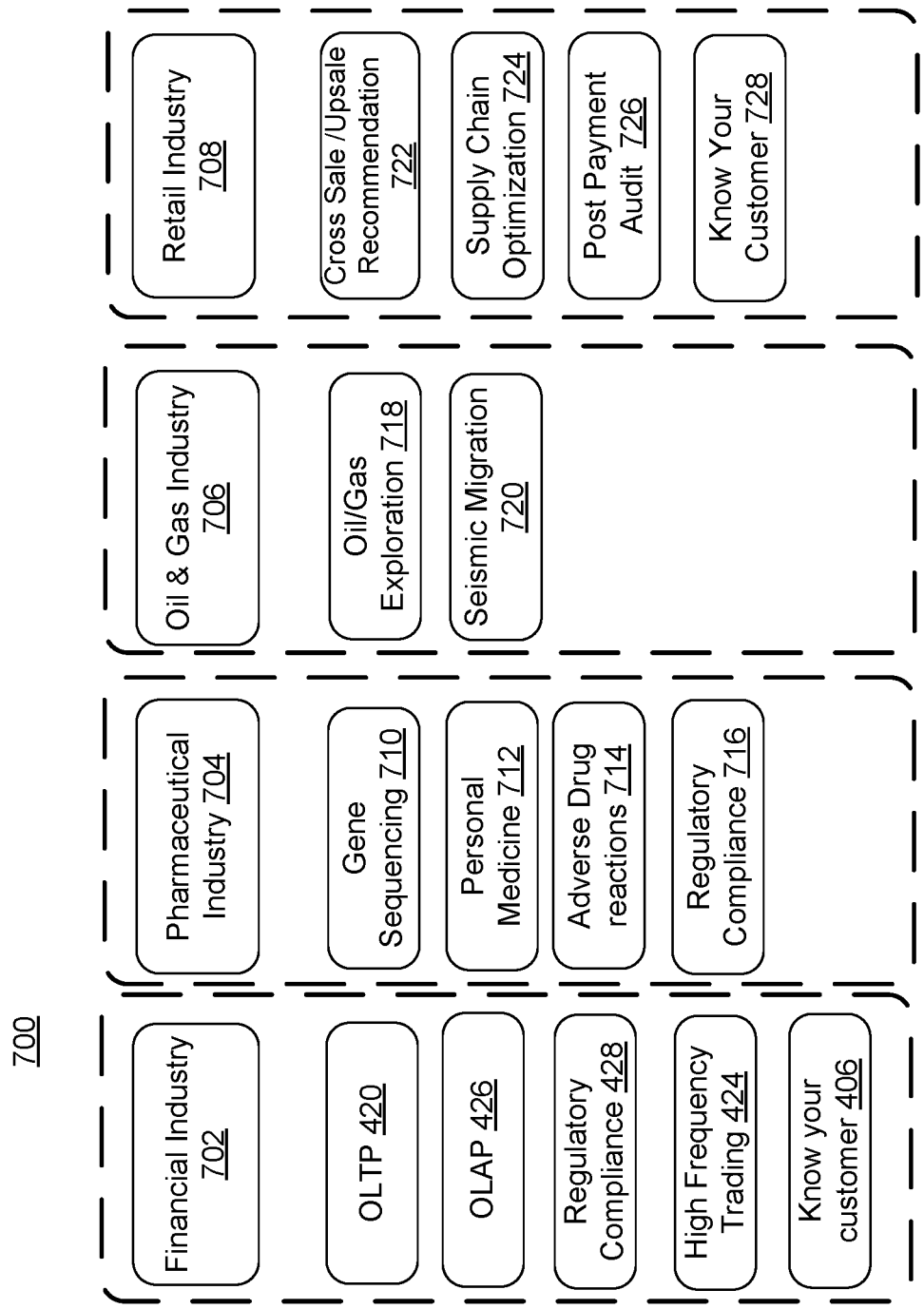
FIG. 7 illustrates an example of characterization of workloads, according to an example embodiment of the present disclosure.

FIG. 7 illustrates, as an example embodiment of the present disclosure, a chart 700 showing the computing resource requirements of the workloads 400, as shown in FIG. 5 and FIG. 6, on the basis of the industry. As will be understood, the aspects illustrated with reference to FIG. 3, FIG. 4, FIG. 5, and FIG. 6 are incorporated and captured by the behavior model constructor 102 while generating the behavior model. In the same manner, the behavior model so constructed also takes into account industry knowledge, as illustrated in FIG. 7, to accurately represent the operation behavioral patterns relevant to a specific industry.

For example, as shown in FIG. 7, the industry-type may range from financial industry 702, pharmaceutical industry 704, oil & gas industry 706, and retail industry 708. In each industry, the workloads 400 shown in FIG. 7 may be specific to every industry. For example, in the pharmaceutical industry 704, the resource intensive workloads may include gene sequencing workloads 710, personal medicine workloads 712, adverse drug reaction capturing workloads 714, and regulatory compliance workloads 716. In another example, in the oil & gas industry 706, the resource intensive workloads can include oil & gas exploration workloads 718 and seismic migration workloads 720. In yet another example, in the retail industry 708, the resource intensive workloads can include cross-selling or up-selling recommendation workloads 722, supply chain optimization workloads 724, post-payment audit workloads 726, and client onboarding workloads 730.

Figure 8:
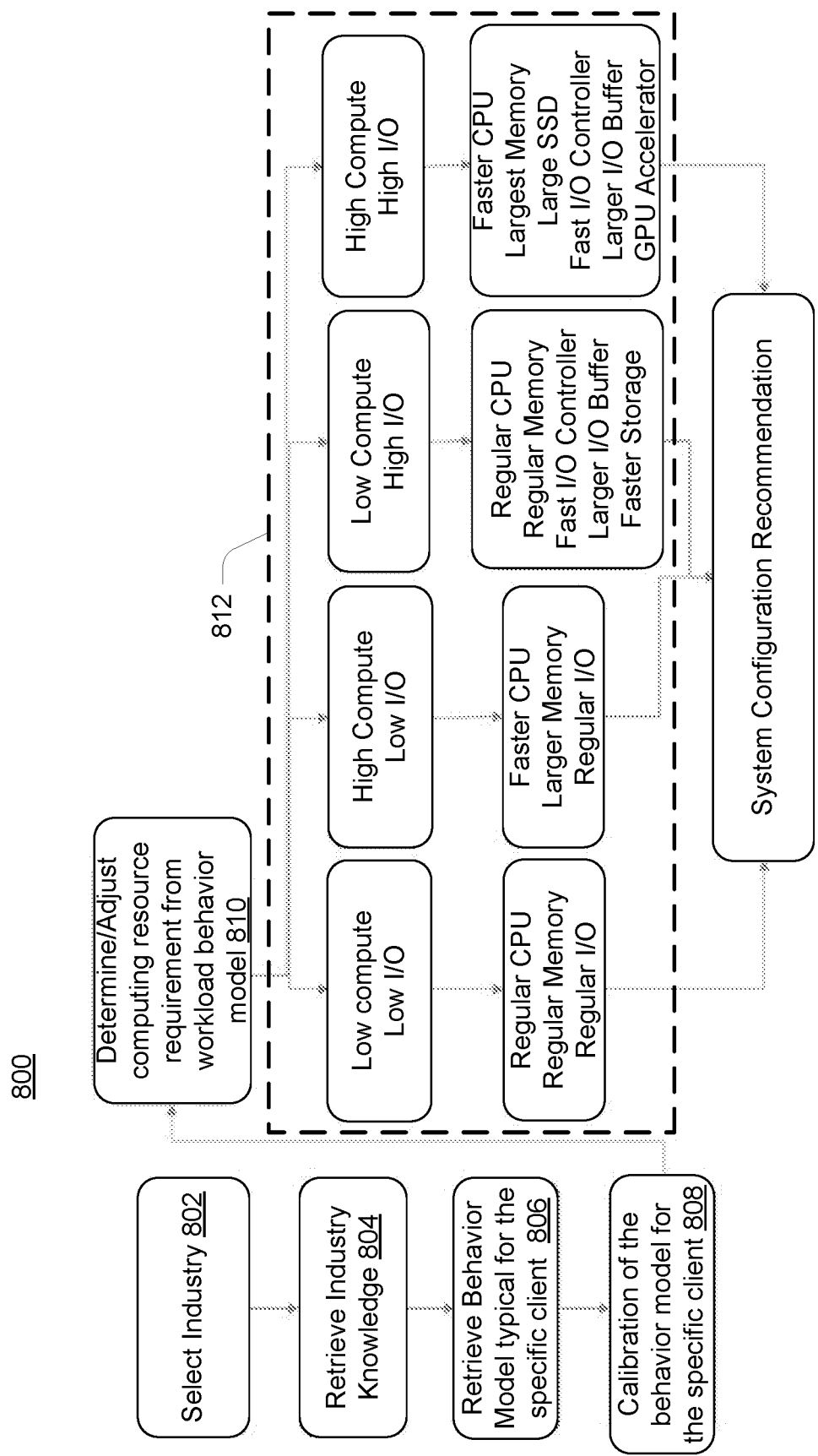
FIG. 8 illustrates operation of an issue predictor of the OTA system, according to an example embodiment of the present disclosure.

FIG. 8 illustrates operation 800 of the issue predictor 104 using the information captured in the behavior model constructed in accordance with the aspects described in FIG. 3, FIG. 4, FIG. 5, FIG. 6, and FIG. 7, according to an example embodiment of the present disclosure. The operation of the issue predictor 104 as described henceforth with reference to FIG. 8 may be in addition to the operation described previously or may be as an alternative.

As mentioned previously, the issue predictor 104 is triggered once the behavior model constructor 102 has constructed the behavior model. Accordingly, to begin with, the model deployer 110 can operate block 802 to identify or select an industry, which is relevant for the deployment of the behavior model. Subsequently, the model deployer 110 can operate block 804 and retrieve the industry knowledge, based on the industry, from the behavior model. For instance, the model deployer 110 can employ the information gathered as part of the behavior model explained with reference to FIG. 7 previously to obtain the industry-specific knowledge, say in terms of the computational resources.

Further, the model deployer 110 may operate block 806 and retrieve the behavior model which is relevant for the current case. For instance, the behavior model can be identified based on the order type, the client, the process, the organization, the industry, or a combination thereof. In addition to the retrieval of the behavior model, the model deployer 110 may operate block 808 to calibrate the behavior model based on specifics associated with the client. For instance, the model deployer 110 may calibrate the behavior model based on the above mentioned parameters, such as order type, the client, the process, the organization, the industry, or a combination thereof. In another case, as part of the re-calibration, the model augmentor 114 may update the behavior model in case the order and the behavior model are not in conformance with each other, in the manner as has been described previously. Accordingly, the model augmentor 114 may take into consideration latent requirements and influences that may otherwise affect the order of the client which are otherwise not visible to the client.

Subsequently, the resolver 112 may operate block 810 to determine for adjustment the resource requirements for the current order, based on the recalibrated behavior model. For example, block 812 illustrates the various adjustments that the resolver 112 may determine for the current order, using the recalibrated behavior model. Accordingly, once the various adjustments have been determined, the resolver 112 can recommend the adjustments to the client for troubleshooting the order.

Therefore, few of the client requirements that may be disclosed by the client may not adequately meet the client requirements. The above mentioned operation of the issue predictor 104 with reference to FIG. 8 allows for the service provider to effectively service the requests by recommending modifications in the order by determining the adjustments in the requirements of the client. Therefore, there may be latent factors, such as client-end policies, practices, and norms, internal workflows, environments, and existing system configurations, that the client may not disclose but are relevant for the order to be appropriately catered to. With the aspects of the OTA system 100 described in FIG. 8, the OTA system 100 may provide for automated troubleshooting of the order by taking into account potential issues or events that can cause the order to be ineffective for the client. For example, with the original order, the client may be unable to meet the market demand and, which in turn, would affect the paying ability of the client. Accordingly, the resolver 112 may consider this eventuality and recommend the adjustments in the resource requirements, and therefore, modifications in the order. At the same time, the adjusted requirement is stored in the case library, as part of the learning repository for use in due course by the OTA system 100.

Figure 9:
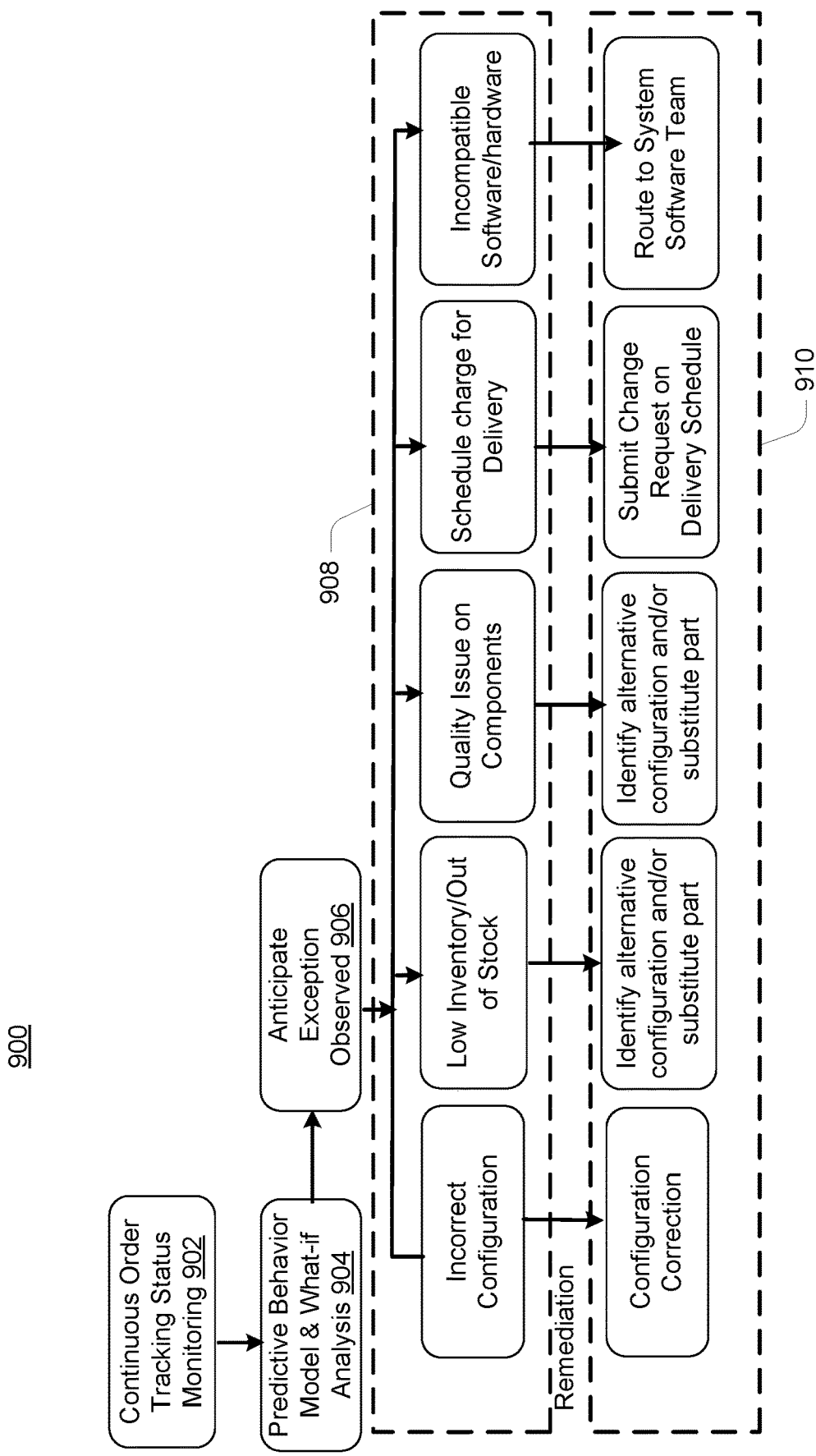
FIG. 9 illustrates operation of a resolver of the OTA system, in accordance with an example embodiment of the present disclosure.

FIG. 9 illustrates the operation 900 of the resolver 112 in providing proactive remediation of the issue affecting the order, in accordance with an example embodiment of the present disclosure. The operation of the resolver 112 as described henceforth with reference to FIG. 9 may be in addition to the operation described previously or may be as an alternative.

To begin with, the resolver 112 may operate block 912 to continuously track and monitor status of the order and may operate block 914 to, simultaneous to the tracking and monitoring, employ the re-calibrated behavior model to perform a what-if analysis on the current status of the order. For example, if there is an expected natural calamity or a geo-political event, or any other event that may affect the order, the resolver 112 may identify such an event using the behavior model, by performing the what-if analysis to formulate various eventualities that may occur in the wake of the event and, accordingly, operate block 906 to anticipate the exceptions or errors that may occur due to such events. Block 908 illustrates the various exceptions or errors that the deployer 112 can identify using the behavior model, as explained above. Further, block 910 illustrates the various troubleshooting options that the resolver 112 can provide for troubleshooting the order and mitigating the influence of the event and the exceptions caused.

Figure 10:
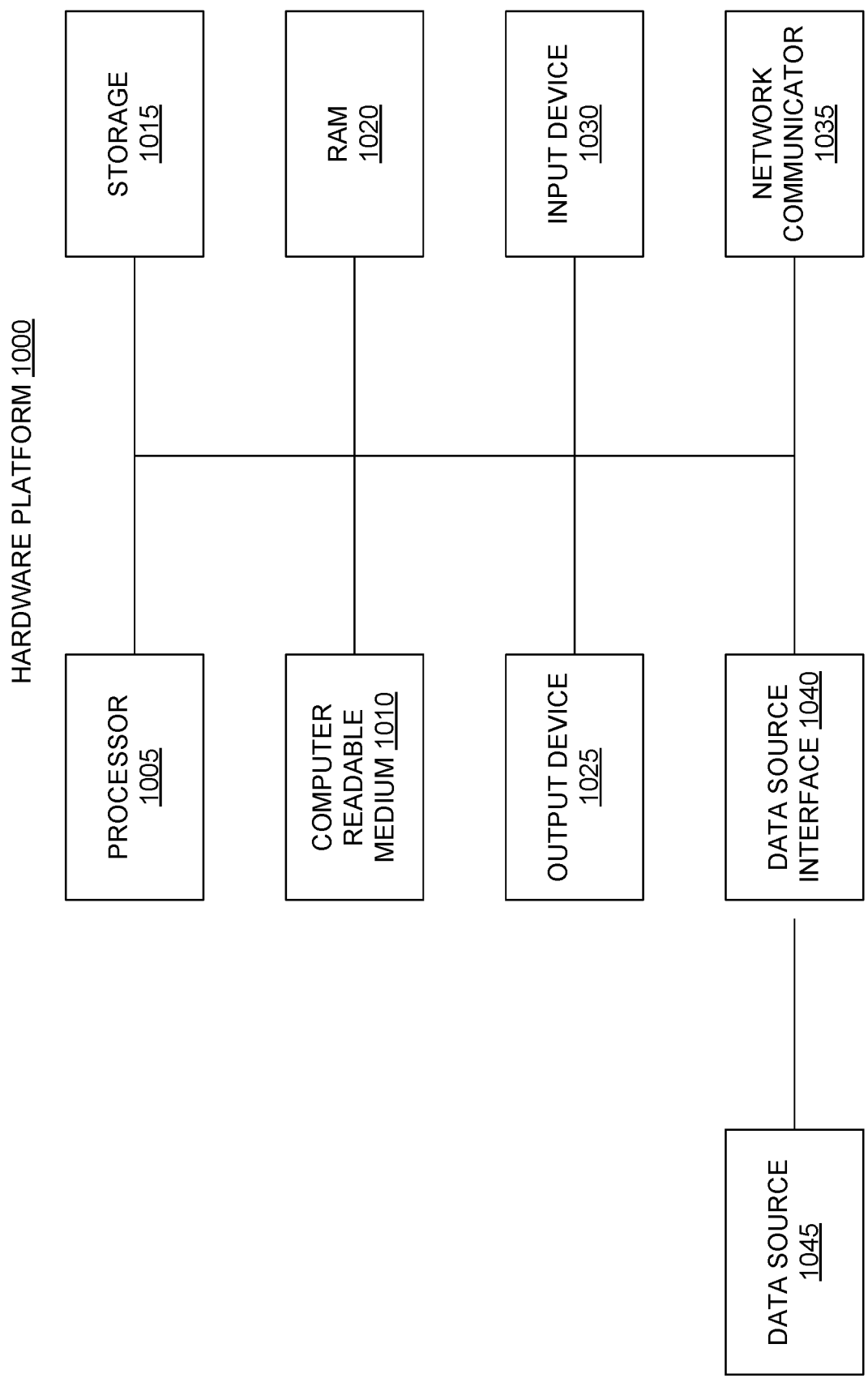
FIG. 10 illustrates a hardware platform for implementation of the OTA system, according to an example embodiment of the present disclosure.

FIG. 10 illustrates a hardware platform 1000 for implementation of the OTA system 100, according to an example of the present disclosure. Particularly, computing machines such as but not limited to internal/external server clusters, quantum computers, desktops, laptops, smartphones, tablets and wearables which may be used to execute the OTA system 100 or may have the structure of the hardware platform 1000. The hardware platform 1000 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Referring to FIG. 10, the hardware platform 1000 may be a computer system 1000 that may be used with the examples described herein. The computer system 1000 may represent a computational platform that includes components that may be in a server or another computer system. The computer system 1000 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).The computer system 1000 may include a processor 1002 that executes software instructions or code stored on a non-transitory computer readable storage medium 1004 to perform methods of the present disclosure. The software code includes, for example, instructions to perform the steps described with reference to the components of the OTA system 100 in FIG. 1 to FIG. 9 previously. In an example, the behavior model constructor 102, the pattern identifier 106, the modeler 108, the issue predictor 104, the model delayer 110, the resolver 112, and the model augmentor 114 may be software codes or components performing these steps.

The instructions on the computer readable storage medium 1004 are read and stored the instructions in storage 1006 or in random access memory (RAM) 1008. The storage 1006 provides a large space for keeping static data where at least some instructions could be stored for later execution. The stored instructions may be further compiled to generate other representations of the instructions and dynamically stored in the RAM 1008. The processor 1002 reads instructions from the RAM 1008 and performs actions as instructed.

The computer system 1000 further includes an output device 1010 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1000 further includes input device 1012 to provide a user or another device with mechanisms for entering data and/or otherwise interact with the computer system 1000. The input device may include, for example, a keyboard, a keypad, a mouse, or a touchscreen. In an example, output of any component of the OTA system 100 is displayed on the output device 1010. Each of these output devices 1010 and input devices 1012 could be joined by one or more additional peripherals.

A network communicator 1014 may be provided to connect the computer system 1000 to a network and in turn to other devices connected to the network including other clients, servers, data stores, and interfaces, for instance. A network communicator 1014 may include, for example, a network adapter such as a LAN adapter or a wireless adapter. The computer system 1000 includes a data source interface 1016 to access data source 1016. A data source is an information resource. As an example, a database of exceptions and inferencing rules may be a data source. Moreover, knowledge repositories and curated data may be other examples of data sources.

Figure 11:
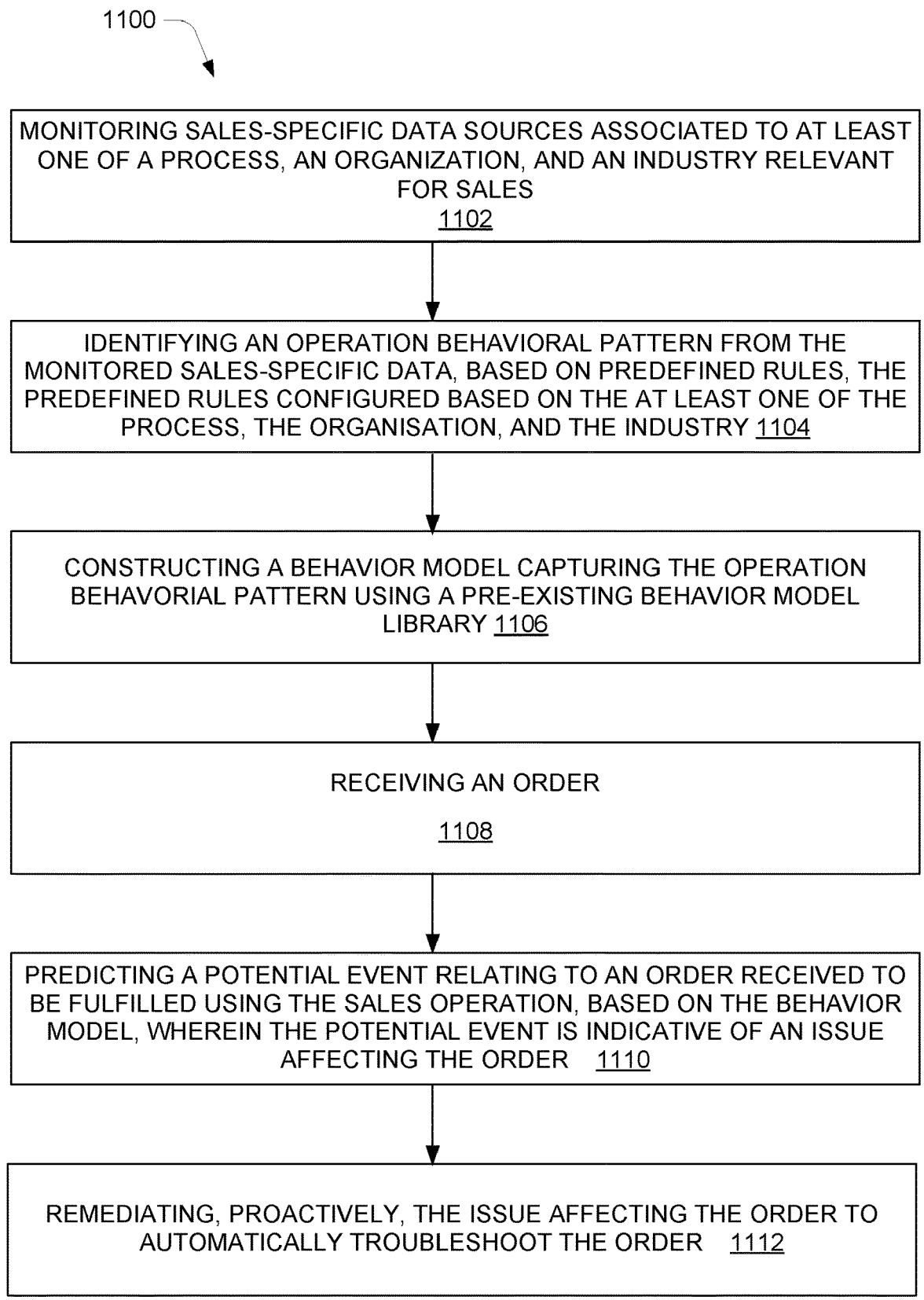
FIG. 11 illustrates a method of automated order troubleshooting, according to an example embodiment of the present disclosure.

FIG. 11 illustrates a method 1100 of automated order troubleshooting, according to an example embodiment of the present disclosure. The method 1100 for automated order troubleshooting may be implemented in two phases. In the first stage, a behavior model which captures operation behavioral pattern indicative of sales-specific behavior associated with client's process, organization, industry, or a combination thereof. In the second phase, the behavioral model is deployed when an order is placed or received to gauge the past, present, and the future scenarios, for determining whether the order can be affected or not, and if it can be affected, automatic troubleshooting for the order is triggered in order to mitigate the effects or completely prevent the order from being affected.

Referring to the method 1100, at block 1102, sales-specific data sources associated with a process, an organization, an industry, or a combination thereof relevant for sales operations can be monitored. In an example, the process, the organization, and the industry that relevant to the sales operation can be selected based on the operation of the party implementing the techniques of the present disclosure. The monitoring of the sales operations can be achieved, in realtime, by querying various data bases and repositories of information, online as well as offline, from which the relevant data can be retrieved. For example, social media, online web portals, and other websites that carry information regarding the process, the organization, the industry, or a combination thereof can be crawled by for retrieving and monitoring the above mentioned information.

Further, at block 1104, an operation behavioral pattern can be identified based on the sales-specific data. In an example, the behavioral pattern so identified can indicate, based on the sales-specific data, the current and future trends that can affect, for instance, demand and supply in the industry, and difference in the current trends from previous trends. The operation behavioral pattern can be identified using the sales-specific data based on predefined rules, the predefined rules mirroring the process, the organization, and the industry relevant for the party conducting the automated order troubleshooting. In an example, the predefined rules can be based on historically recorded cases for that ordering process in that industry, process, organization, and the like.

Subsequently, at block 1106, the behavior model is then constructed to emulate the monitored sales-specific data as well as the operation behavior pattern as mentioned above. In an example, a pre-existing behavior model library can be the basis for constructing the behavior model. For instance, the pre-existing behavior model library can serve as a template for generating the behavior model which attempts to mimic the operation behavioral pattern. According to an aspect, the behavior model attempts to capture various steps of the sales operation, in which each step has been identified as an issue-causing juncture in the sales operation. In other words, the behavior model attempts to capture as many as possible points of failure in the sales-to-delivery process in order management. At the same time, the behavior model traces the sales operation from order placement to final delivery for achieving the capability of predicting the potential event. This concludes the first phase of the method 1100 for automated order troubleshooting. Subsequently, the second phase of the method 1100 commences.

Accordingly, at block 1108, an order is received, which can be catered to by deploying the behavior model to automatically troubleshoot the order, if required.

Subsequently, the order is assessed in view of the behavior model. Accordingly, at block 1110, any potential event relating to the order received to be fulfilled using the sales operation is predicted based on the behavior model. The potential event is indicative of an issue that can affect the order directly or indirectly. For example, a direct influence can be in the form of a real and present event, such as a natural calamity, that can affect the order fulfilment. An indirect influence can be in the form of an economic, political, or social situation brewing in a region which may affect a demand or supply which, in turn, affects the order. In addition, as mentioned previously, the prediction of the order being affected can be from the point of view of the service provider or of the consumer. In either case, the factors may be same or similar. As mentioned previously, the behavior model is built to trace the sales operation from order placement to final delivery to predict the potential event.

In an example, as part of the prediction of the potential event, an investigation of previously encountered exceptions during sales process and previously raised issues during sales process may also be done to identify the potential event or issue affecting the order. Further, the present disclosure provides aggregation of newfound influencers in the behavioral model. Accordingly, in one example, the order is investigated to determine whether the order conforms to the behavioral model or not, which, as mentioned above, is done on the basis of the operation behavioral pattern associated with that order. In the eventuality that the order does not conform to the behavioral model, a hypothesis is generated for that order and the hypothesis incorporated in the behavioral model, so as to enable prediction of the potential event even in such an eventuality. In other words, in case the order does not conform to the behavior model, which means that the behavior model is unable to accurately mirror the operation pattern, then this new behavioral pattern is incorporated into the behavior model.

Further, at block 1112, in case an event that can potentially affect the order is predicted, automatic troubleshooting of the order is initiated and proactive remediation of the issue affecting the order is achieved. For example, in one case, a hypothesis is generated based on historical data and a recommendation for resolving the issue is provided based on the hypothesis. In addition, as part of automation of order troubleshooting, an alert can be generated for all stakeholders, such as sales team, operations team, delivery teams, and validation teams, in the sales operation, in response to the prediction of the potential event. This may allow the stakeholders to pre-emptively provide a resolution to the issue associated with the predicted potential event.

What has been described and illustrated herein are examples of the present disclosure along with some of its variations. The terms, descriptions and figures used herein are set forth via illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. An Order Troubleshooting Automation (OTA) system comprising:
a processor; and
a memory storing instructions, which when executed by the processor, cause the system to:
query online sales-specific data sources associated with at least one of a process, an organization, and an industry relevant for sales operations by accessing at least one of a social media website, an online web portal, and webpage associated with at least one of the process, the organization, and the industry relevant for the sales operations;
monitor the queried sales-specific data sources in real-time and retrieve sales-specific data from the queried sales-specific data sources;
identify an operation behavioral pattern from the sales-specific data, based on predefined rules, the predefined rules configured based on the at least one of the process, the organization, and the industry, wherein the operation behavioral pattern indicates current and uture trends in the at least one of the process, the organization, and the industry,
wherein, to identify the operation behavioral pattern, the processor is configured to perform an analysis on resource requirements of at least one of the process, the organization, and the industry by determining whether the at least one of the process, the organization, and the industry is sensitive to an one or a combination of latency, throughput, computational power, and memory, wherein the determination is performed based on characterization of workload of the at least one of the process, the organization, and the industry based on computational intensiveness and communication intensiveness of the workload;
upon identification of the operation behavioral pattern, construct a behavior model capturing the operation behavioral pattern using a pre-existing behavior model library and the sales-specific data, wherein pre-existing behavior model library includes a template for generating the behavior model by capturing the operation behavioral pattern;
receive, from a client, a request pertaining to an order for a service or a product;
deploy the behavior model to predict a potential event relating to the order received to be fulfilled using the sales operation, based on the behavior model, wherein the potential event is predicted by tracking one or more activities associated with the sales operation, wherein the potential event is indicative of an issue affecting the order, wherein, to predict the potential event, the processor is configured to:
determine whether the order conforms to the behavior model based on an operation behavioral pattern associated with the order by determining whether the order falls within a set of predetermined operation behavior patterns associated with the behavior model;
in response to the determination that the order does not conform to the behavior model:
predict the potential event relating to the order to be fulfilled using the sales operation; and
calibrate the behavior model by incorporating the operation behavioral pattern associated with the order into the behavior model; and
upon the prediction of the potential event, determine adjustments in resource requirements for the order based on the calibrated behavior model; and
wherein the order is modified according to the determined adjustments in the resource requirements to automatically remediate the issue affecting the order, thereby facilitating automatically troubleshooting of the order in an effective manner.

2. The OTA system as claimed in claim 1, wherein the processor is to:
generate a hypothesis based on historical data; and
provide a recommendation based on the hypothesis to remediate the issue.

3. The OTA system as claimed in claim 1, wherein the processor is to capture a plurality of steps of the sales operation, each of the plurality of steps being identified as an issue-causing juncture in the sales operation.

4. The OTA system as claimed in claim 1, wherein the processor is to trace the sales operation from order placement to final delivery to predict the potential event.

5. The OTA system as claimed in claim 1, wherein the processor is to:
investigate the order to determine whether the order conforms to the behavioral model or not, based on the operation behavioral pattern associated with the order;
generate a hypothesis for the order, when the order does not conform to the behavioral model; and
incorporate the hypothesis in the behavioral model to predict the potential event.

6. The OTA system as claimed in claim 1, wherein the processor is to generate an alert for stakeholders in the sales operation, in response to the prediction of the potential event.

7. A method performed by a processor, the method comprising:
querying sales-specific data sources associated with at least one of a process, an organization, and an industry relevant for sales operations, wherein the online querying includes accessing at least one of a social media website, and online web portal, and webpage associated with at least one of the process, the organization, and the industry relevant for the sales operations;
monitoring the queried sales-specific data sources in real-time and retrieving sales-specific data from the queried. sales-specific data sources;
identifying an operation behavioral pattern from the sales-specific data, based on predefined rules, the predefined rules configured based on the at least one of the process, the organization, and the industry. wherein the operation behavioral pattern indicates current and future trends in the at least one of the process, the organization, and the industry,
wherein the identifying comprises performing an analysis on resource requirements of at least one of the process, the organization, and the industry by determining whether the at least one of the process, the organization, and the industry is sensitive to any one or a combination of latency, throughput, computational power, and memory, wherein the determination is performed based on characterization of workload of the at least one of the process, the organization, and the industry based on computational intensiveness and communication intensiveness of the workload;

upon identification of the operation behavioral pattern, constructing a behavior model capturing the operation behavioral pattern using a pre-existing behavior model library and the sales-specific data, wherein pre-existing behavior model library includes a template for generating the behavior model by capturing the operation behavioral pattern;

receiving, from a client, a request pertaining to an order for a service or a product;

predicting a potential event relating to the order received to be fulfilled using the sales operation, based on the behavior model, wherein the potential event is predicted by tracking one or more activities associated with the sales operation, wherein the potential event is indicative of an issue affecting the order, wherein the predicting the potential event comprises:

determining whether the order conforms to the behavior model based on an operation behavioral pattern associated with the order by determining whether the order falls within a set of predetermined operation behavior patterns associated with the behavior model;

in response to the determination that the order does not conform to the behavior model:

predicting the potential event relating to the order to be fulfilled using the sales operation; and calibrating the behavior model by incorporating the operation behavioral pattern associated with the order no the behavior model, and upon the prediction of the potential event, determining adjustments in resource requirements for the order based on the calibrated behavior model, wherein the order is modified according to the determined adjustments in the resource requirements to automatically remediate the issue affecting the order, thereby facilitating automatically troubleshooting of the order in an effective manner.

8. The method as claimed in claim 7, wherein the remediating comprises:

generating a hypothesis based on historical data; and
providing a recommendation based on the hypothesis to remediate the issue.

9. The method as claimed in claim 7, wherein the behavior model captures a plurality of steps of the sales operation, each of the plurality of steps identified as an issue-causing juncture in the sales operation.

10. The method as claimed in claim 7, wherein the behavior model traces the sales operation front order placement to final delivery to predict the potential event.

11. The method as claimed in claim 7, wherein the predicting comprises:

investigating the order to determine whether the order conforms to the behavioral model or not, based on the operation behavioral pattern associated with the order;
generating a hypothesis for the order, when the order does not conthrm to the behavioral model; and
incorporating the hypothesis in the behavioral model to predict the potential event.

12. The method as claimed in claim 7, further comprising generating an alert for stakeholders in the sales operation, in response to the prediction of the potential event.

13. A non-transitory computer readable medium including machine readable instructions that are executable by a processor to:

query online sales-specific data sources associated with at least one of a process, an organization, and an industry relevant for sales operations by accessing at least one of a social media website, an online web portal, and webpage associated with at least one of the process, the organization, and the industry relevant for the sales operations;

monitor the queried sales-specific data sources in real-time and retrieve sales-specific data from the queried sales-specific data sources;

identify an operation behavioral pattern from the sales-specific data, based on predefined rules, the predefined rules configured based on the at least one of the process, the organization, and the industry, wherein the operation behavioral pattern indicates current and future trends in the at least one of the process, the organization, and the industry, wherein, to identify the operation behavioral pattern, the processor is configured to perform an analysis on resource requirements of at least one of the process, the organization,and the industry by determining whether the at least one of the process, the organization, and the industry is sensitive to any one or a combination of latency, throughput, computational power, and memory, wherein the determination is performed based on characterization of workload of the at least one of the process, the organization, and the industry based on computational intensiveness and communication intensiveness of the workload;

upon identification of the operation behavioral pattern, construct a behavior model capturing the operation behavioral pattern using a pre-existing behavior model library and the sales-specific data, wherein pre-existing behavior model library includes a template for generating the behavior model by capturing the operation behavioral pattern;

receive, from a client, a request pertaining to an order for a service or a product;

predict a potential event relating to an order received to be fulfilled using the sales operation, based on the behavior model, wherein the potential event is predicted by tracking one or more activities associated with the sales operation, wherein the potential event is indicative of an issue affecting the order, wherein, to predict the potential event, the processor is configured to:

determine whether the order conforms to the behavior model based on an operation behavioral pattern associated with the order by determining whether the order falls within a set of predetermined operation behavior patterns associated with the behavior model;

in response to the determination that the order does not conform to the behavior model:

predict the potential event relating to the order to be fulfilled using the sales operation; and calibrate the behavior model by incorporating the operation behavioral pattern associated with the order into the behavior model; and upon the prediction of the potential event, determine adjustments in resource requirements for the order based on the calibrated behavior model, wherein the order is modified according to the determined adjustments in the resource requirements to automatically remediate the issue affecting the order, thereby facilitating automatically troubleshooting of the order in an effective manner.

14. The non-transitory computer readable medium as claimed in claim 13, wherein the processor is to:

generate a hypothesis based on historical data; and provide a recommendation based on the hypothesis to remediate the issue.

15. The non-transitory computer readable medium as claimed in claim 13, wherein the processor is to:
investigate the order to determine whether the order conforms to the behavioral model or not, based on the operation behavioral pattern associated with the order;
generate a hypothesis for the order, when the order does not conform to the behavioral model; and
incorporate the hypothesis in the behavioral model to predict the potential event.

16. The non-transitory computer readable medium as claimed in claim 13, wherein the processor is to:
trace the sales operation from order placement to final delivery to predict the potential event; and
capture a plurality of steps of the sales operation, each of the phirality of steps identified as an issue-causing juncture in the sales operation.

17. The non-transitory computer readable medium as claimed in claim 13, wherein the processor is to generate an alert for stakeholders in the sales operation, in response to the prediction of the potential event.

* * * * *

UNITED STATES PATENT AND TRADEMARK OFFICE
CERTIFICATE OF CORRECTION

PATENT NO. : 11,308,545 B2
APPLICATION NO. : 16/159428
DATED : April 19, 2022
INVENTOR(S) : Chung-Sheng Li et al.

It is certified that error appears in the above-identified patent and that said Letters Patent is hereby corrected as shown below:

In the Claims

At Claim 1, Column 17, Line 27 from the top, the phrase "and uture trends" should instead read "and future trends"

At Claim 1, Column 17, Line 34 from the top, the phrase "to an one" should instead read "to any one"

At Claim 7, Column 18, Line 43 from the top, the phrase "and online" should instead read "an online"

At Claim 7, Column 18, Lines 52 from the top, the phrase "industry.wherein" should instead read "industry, wherein"

At Claim 7, Column 19, Line 29 from the top, the phrase "no the behavior model," should instead read "into the behavior model;"

At Claim 10, Column 19, Line 48 from the top, the phrase "front order" should instead read "from order"

At Claim 11, Column 19, Line 56 from the top, the phrase "conthrm to the" should instead read "conform to the"

At Claim 16, Column 21, Line 17 from the top, the phrase "the phirality" should instead read "the plurality"

Signed and Sealed this
Fourteenth Day of February, 2023

*Katherine Kelly Vidal*

Katherine Kelly Vidal
*Director of the United States Patent and Trademark Office*